US008302209B2

(12) United States Patent
Tsubono

(10) Patent No.: US 8,302,209 B2
(45) Date of Patent: Oct. 30, 2012

(54) DATA PROCESSING METHODS AND DEVICES FOR READING FROM AND WRITING TO EXTERNAL STORAGE DEVICES

(75) Inventor: Eiji Tsubono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1366 days.

(21) Appl. No.: 11/732,452

(22) Filed: Apr. 3, 2007

(65) Prior Publication Data

US 2007/0234060 A1 Oct. 4, 2007

(30) Foreign Application Priority Data

Apr. 3, 2006 (JP) .................. 2006-101566

(51) Int. Cl.
*G06F 7/04* (2006.01)
(52) U.S. Cl. ............. 726/28; 713/189; 711/100
(58) Field of Classification Search ........... None
See application file for complete search history.

(56) References Cited

U.S. PATENT DOCUMENTS

| 7,093,049 B2 * | 8/2006 | Harada et al. ........ 710/303 |
| 2005/0182973 A1 | 8/2005 | Funahashi et al. |

FOREIGN PATENT DOCUMENTS

| JP | 59-017650 | 1/1984 |
| JP | 06-059962 | 3/1994 |
| JP | 07-104882 | 4/1995 |
| JP | 10-143443 | 5/1998 |
| JP | 2002-183076 | 6/2002 |
| JP | 2004-055102 | 2/2004 |
| JP | 2005-209038 | 8/2005 |
| JP | 2005-293282 | 10/2005 |
| JP | 2006-268436 | 10/2006 |
| JP | 2006-268437 | 10/2006 |
| JP | 2006-268438 | 10/2006 |

* cited by examiner

*Primary Examiner* — Shewaye Gelagay
(74) *Attorney, Agent, or Firm* — Nutter McClennen & Fish LLP; John J. Penny, Jr.; Michael P. Visconti, III

(57) ABSTRACT

A data processing device includes a data storage section that stores data; an authentication information storage section that stores first authentication information registered by a user; an input section that allows the user to input second authentication information; a first judgment section that permits reading of the data stored in the data storage section when the first authentication information matches the second authentication information, and does not permit reading of the data stored in the data storage section when the first authentication information does not match the second authentication information; a slot into which an external storage device can be inserted; and a writing admission section that permits writing of the data stored in an external storage device into the data storage section without input of the second authentication information when the external storage device is inserted into the slot.

8 Claims, 9 Drawing Sheets

DATA PROCESSING METHODS AND DEVICES FOR READING FROM AND WRITING TO EXTERNAL STORAGE DEVICES

The entire disclosure of Japanese Patent Application No. 2006-0101566, filed Apr. 3, 2006 is expressly incorporated by reference herein.

BACKGROUND

1. Technical Field

The present invention relates to a data processing device, and particularly, to a data processing device having a data storage section storing data.

2. Related Art

Image data picked up by an image pick-up device such as a digital camera can be stored in various memory cards inserted into the image pick-up device. Although the capacity of such memory cards is increasing, there still exists a problem that a capacity of the memory card can become used up during use thereof when being used an image pick-up device having a high number of pixels or when a moving image is being picked up, whereby image pick-up cannot be further continued. To solve the problem, a portable storage device has appeared so as to meet a desire for ensuring a capacity used for newly picked up image data in the memory card by taking a back-up of the image data from the memory card during image pick-up outdoors. The storage device is smaller and lighter than a personal computer. The storage device is fast in starting up and easy to operate.

However, since various kinds of data are stored in the storage device, it is necessary to ensure security of the stored data. Input of authentication information such as a password may be required of users at the time of starting up the storage device so as to ensure the security of the data.

A method of requiring input of authentication information such as a password at the time of starting up is widely used as a measure for preventing unauthorized access of a personal computer (for example, see JP-A-2005-293282). However, when the method is applied to a data processing device such as the above-mentioned storage device, input of the authentication information is necessary even at the time of backing up the data stored in the memory card in the data processing device, thereby causing the user trouble. In other words, since the portable storage device is powered by a battery, power is normally turned off when the device is not in use and the power is turned on only when the portable storage device is being used.

However, when the input of the authentication information is required at the time of starting up the storage device, a start-up speed, which is one of the features thereof, decreases, thereby decreasing user convenience. In particular, when the user backs up the data stored in the memory card in the data processing device, the user may want to pick up new images using the memory card as soon as possible by making the memory card empty as soon as possible.

Meanwhile, when a data security measure for a data processing device such as the storage device is not taken at all, the data is not generally encrypted. Accordingly, when the data processing device is lost or stolen, the data may be undesirably read by third parties.

SUMMARY

An advantage of some aspects of the invention is that it provides a data processing device in which a security measure for protecting data is taken and user convenience is ensured.

According to a first aspect of the invention, a data processing device includes a data storage section that stores data; an authentication information storage section that stores first authentication information registered by a user; an input section that allows the user to input second authentication information; a first judgment section that permits reading of the data stored in the data storage section when the first authentication information matches the second authentication information, and does not permit reading of the data stored in the data storage section when the first authentication information does not match the second authentication information by acquiring the first authentication information from the authentication information storage section when the second authentication information is input by the input section and by comparing the first authentication information with the second authentication information; a slot into which an external storage device can be inserted; and a writing admission section that permits writing of the data stored in the external storage device into the data storage section without input of the second authentication information when the external storage device is inserted into the slot.

In this case, the data processing device may further include a registration section that registers at least one external storage device as an storage device from which data is permitted to be read when the external storage device is inserted into the slot in the data processing device.

In this case, the data processing device may further include a second judgment section that permits reading of data stored in the data storage section when the external storage device is a registered external storage device and does not permit reading of the data stored in the data storage section when the external storage device is an unregistered external storage device by judging whether or not the external storage device is an external storage device registered by the registration section when the external storage device is inserted into the slot.

In this case, the registration section may generate authentication information and writes the generated authentication information into the external storage device inserted into the slot and the second judgment section reads the authentication information from the external storage device inserted into the slot and may judge that the external storage device is a registered external storage device when the read authentication information matches the generated authentication information.

Alternatively, the registration section may read identification information of the external storage device from the external storage device inserted into the slot and may store the read identification information in an identification information storage section and the second judgment section reads the identification information from the external storage device inserted into the slot, and may judge that the external storage device is a registered external storage device when the read identification information matches the identification information stored in the identification information storage section.

The data processing device may further include a start-up section that starts up the data processing device in a state in which the data stored in the data storage section cannot be read when power is turned on.

In this case, the data processing device may further include a host connecting section that is connected to a host terminal as a device terminal and allows the host terminal to read the data stored in the data storage section, wherein the start-up section may be started up so that the host terminal is disconnected from the data processing device although the host terminal is connected to the host connecting section.

In this case, in the data processing device, the host terminal may be connected to the data processing device when the host terminal is connected to the host connecting section after a first judgment section judges that first authentication information matches second authentication information.

According to a second aspect of the invention, a method of controlling a data processing device including a data storage section storing data, an authentication information storage section storing first authentication information registered by a user, and a slot into which an external storage device can be inserted includes the steps of allowing the user to input second authentication information; permitting reading of the data stored in the data storage section when the first authentication information matches the second authentication information, but not permitting reading of the data stored in the data storage section when the first authentication information does not match the second authentication information by acquiring the first authentication information from the authentication information storage section when the second authentication information is input by the input section and by comparing the first authentication information with the second authentication information; and permitting writing of the data stored in the external storage device into the data storage section without input of the second authentication information when the external storage device is inserted into the slot.

According to a third aspect of the invention, a program of controlling a data processing device including a data storage section storing data, an authentication information storage section storing first authentication information registered by a user, and a slot into which an external storage device can be inserted allows the data processing device to execute the steps of allowing the user to input second authentication information; permitting reading of the data stored in the data storage section when the first authentication information matches the second authentication information, but not permitting reading of the data stored in the data storage section when the first authentication information does not match the second authentication information by acquiring the first authentication information from the authentication information storage section when the second authentication information is input by the input section and by comparing the first authentication information with the second authentication information; and permitting writing of the data stored in the external storage device into the data storage section without input of the second authentication information when the external storage device is inserted into the slot.

According to a fourth aspect of the invention, a recording medium in which a program for controlling a data processing device is recorded, wherein the data processing device includes a data storage section storing data, an authentication information storage section storing first authentication information registered by a user, and a slot into which an external storage device can be inserted has the program recorded therein, which allows the data processing device to execute the steps of allowing the user to input second authentication information; permitting reading of the data stored in the data storage section when the first authentication information matches the second authentication information, but not permitting reading of the data stored in the data storage section when the first authentication information does not match the second authentication information by acquiring the first authentication information from the authentication information storage section when the second authentication information is input by the input section and by comparing the first authentication information with the second authentication information; and permitting writing of the data stored in the external storage device into the data storage section without input of the second authentication information when the external storage device is inserted into the slot.

According to a fifth aspect of the invention, a data processing device includes a data storage section that stores data; a host connecting section that is connected to a host terminal as a device terminal and allows the host terminal to read the data stored in the data storage section, the host connecting section being disconnected from the host terminal; an authentication information storage section that stores first authentication information registered by a user; an input section that allows the user to input second authentication information; and a first judgment section that allows the host terminal to read the data stored in the data storage section by making a connection with the host terminal when the first authentication information matches the second authentication information and the host terminal is connected to the host connecting section, but does not allow the host terminal to read the data stored in the data storage section by maintaining disconnection from the host terminal although the host terminal is connected to the host connecting section when the first authentication information does not match the second authentication information by acquiring the first authentication information from the authentication information storage section when the second authentication information is input by the input section and by comparing the first authentication information with the second authentication information.

In this case, The data processing device may further include a slot into which an external storage device is inserted; a registration section that registers at least one external storage device as an storage device from which data is permitted to be read when the external storage device is inserted into the slot in the data processing device; and a second judgment section that makes a connection with the host terminal when the host terminal is connected to the host connecting section without input of the second authentication information when the external storage device is an unregistered external storage device by judging whether or not the external storage device is an external storage device registered by the registration section when the external storage device is inserted into the slot.

In this case, the data processing device may further include a writing admission section that permits writing of the data stored in the external storage device into the data storage section without input of the second authentication information and although the external storage device is not match a registered external storage device when the external storage device is inserted into the slot.

A display screen may not be provided in the data processing device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. A technical scope of the invention is not limited to the embodiments to be described below.

First Embodiment

Figure 1:
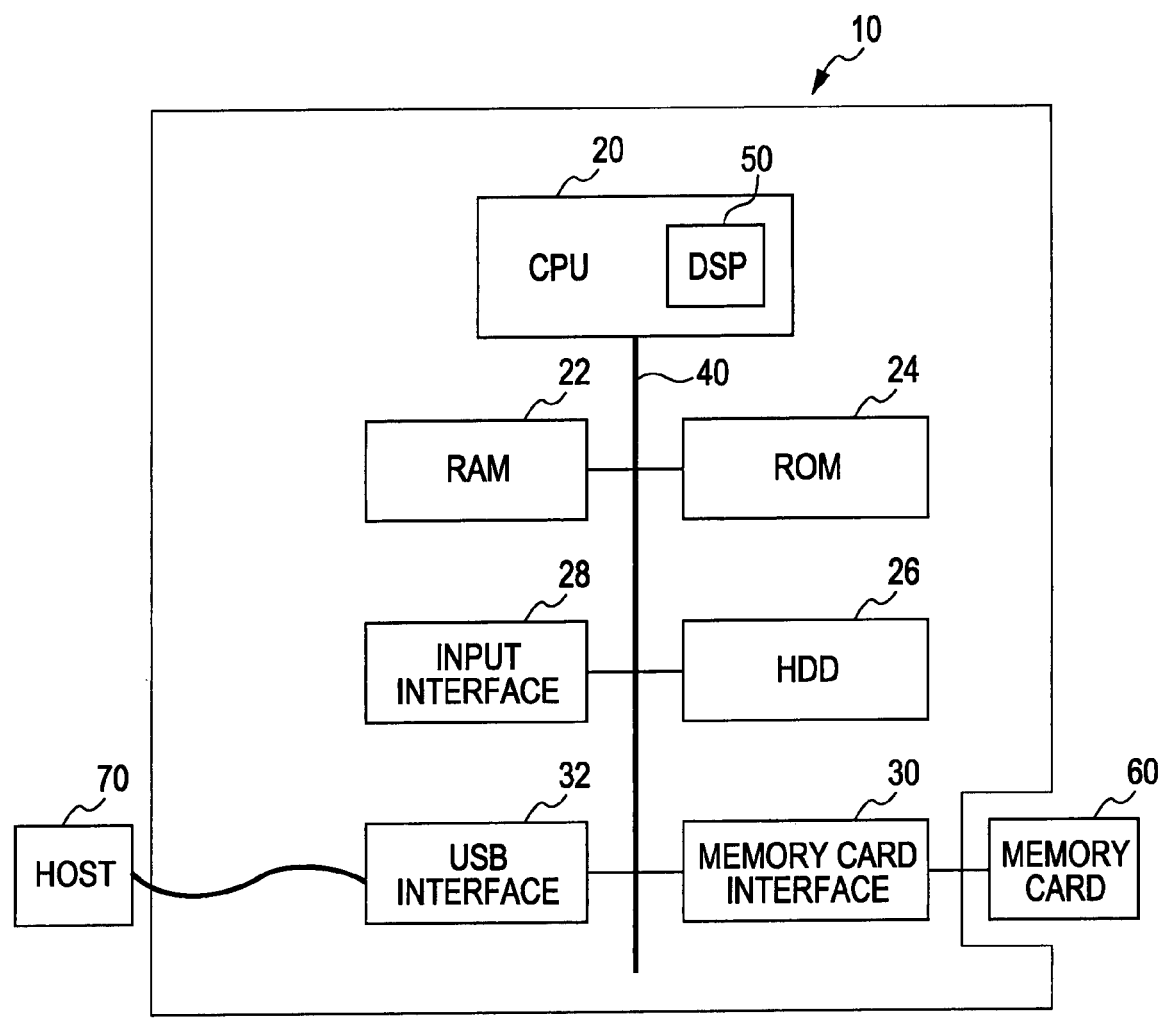
FIG. 1 is a block diagram illustrating an example of an internal configuration of a data processing device according to a first embodiment of the invention.

FIG. 1 is a block diagram illustrating an internal configuration of a data processing device 10 according to a first embodiment of the invention. As shown in FIG. 1, the data processing device 10 according to the embodiment of the invention includes a CPU (Central Processing Unit) 20, a RAM (Random Access Memory) 22, a ROM (Read Only Memory) 24, a hard disk drive 26, an input interface 28, a memory card interface 30, and a USB interface 32 which are interconnected via an internal bus 40.

The CPU 20 has a DSP (Digital Signal Processor) 50 built therein. The DSP 50 performs a process required for reproducing data including still images, moving images, music, and the like which are stored in the hard disk drive 26. The hard disk drive 26 constitutes a nonvolatile data storage device according to the embodiment of the invention.

The data processing device 10 has a memory card 60 appropriately mounted therein. Various kinds of data stored in the memory card 60 mounted in the data processing device 10 can be input through the memory card interface 30 by the data processing device 10. More specifically, the data stored in the memory card 60 is input through the memory card interface 30 by the CPU 20 and is stored in the hard disk drive 26. In the embodiment, the memory card 60 is constituted by, for example, a CF (Compact Flash: Registered Trademark) memory card or a SD (Secure Digital: Registered Trademark) memory card.

The data processing device 10 is connected to a host terminal 70 via a cable connected to the USB interface 32. In other words, the data processing device 10 can serve as a USB device when it is connected to the host terminal 70 serving as a USB host. The host terminal 70 is connected to the data processing device 10 as needed and it is normally disconnected from the data processing device 10 when a user carries the data processing device 10.

In the embodiment, a portable photo viewer is used as the data processing device 10, but the data processing device 10 may be constituted by a personal computer of a desktop type, a personal computer of a notebook type, a cellular phone, or the like.

Figure 2:
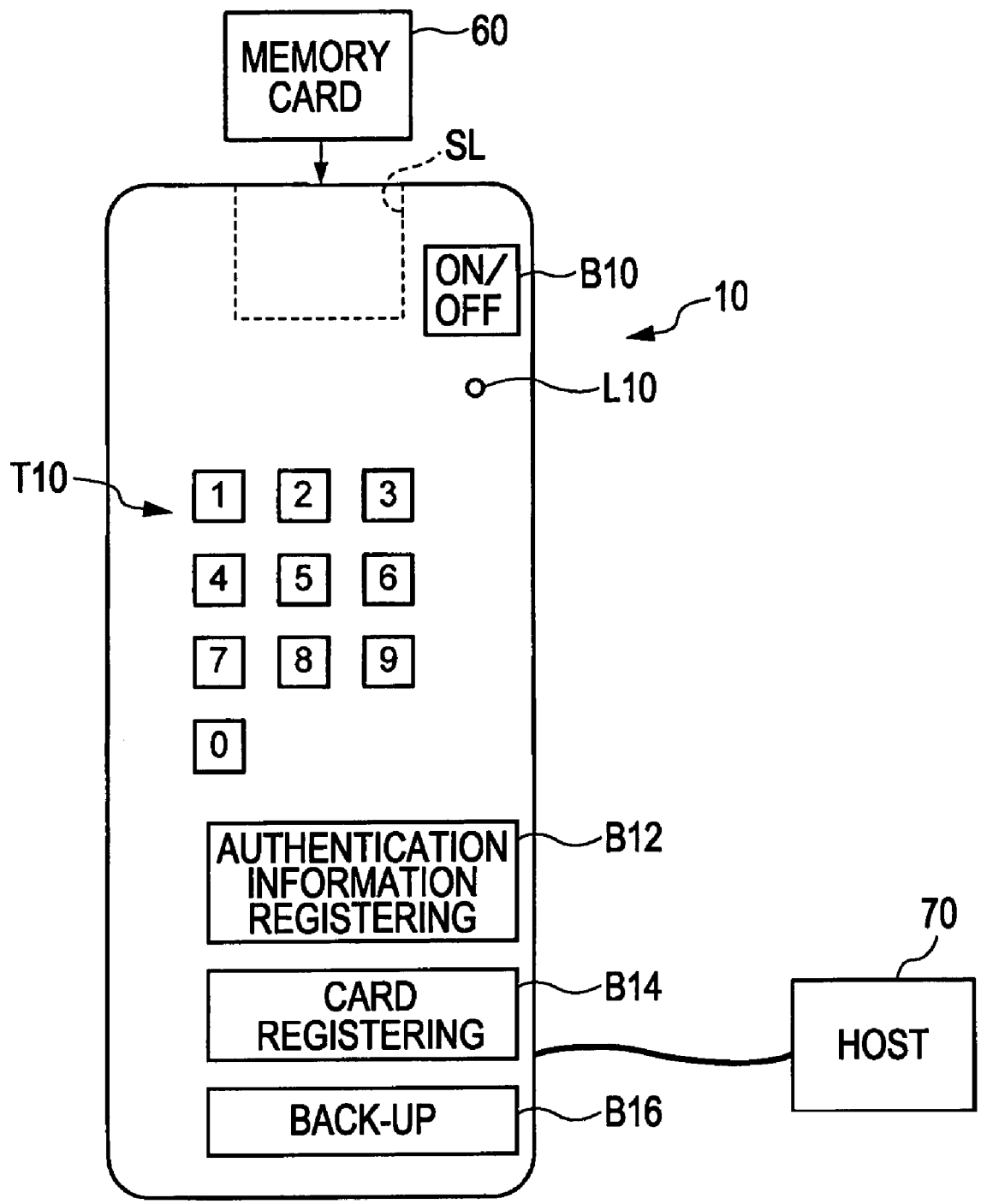
FIG. 2 is a front view illustrating a layout of the data processing device shown in FIG. 1.

FIG. 2 is a front view illustrating a layout of the data processing device 10 according to the embodiment of the invention. As shown in FIG. 2, the data processing device 10 includes a numeric keypad T10 of "0" to "9", a power button B10 for switching on/off, an authentication information registering button B12 for registering authentication information, a card registering button B14 for registering the memory card 60, and a back-up button B16 for taking a back-up.

A display element L10 for informing the user of a state of the data processing device 10 is provided below the power button B10. The display element L10 is constituted by, for example, an LED. A section that informs the user of the state of the data processing device 10 is not limited to the display element L10, but for example, may be constituted by a sound device generating beep tones.

A slot SL used into which the memory card 60 can be inserted is provided in an upper part of the data processing device 10. When the memory card 60 is inserted into the slot SL by the user, the memory card 60 is connected to the data processing device 10 via the above-mentioned memory card interface 30. In the embodiment, the slot SL is constituted by, for example, a CF memory card slot or a SD card memory slot.

As shown in FIGS. 1 and 2, a display screen is not provided in the data processing device 10 according to the embodiment of the invention. However, the display screen may be additionally provided in the data processing device 10 shown in FIGS. 1 and 2.

Figure 3:
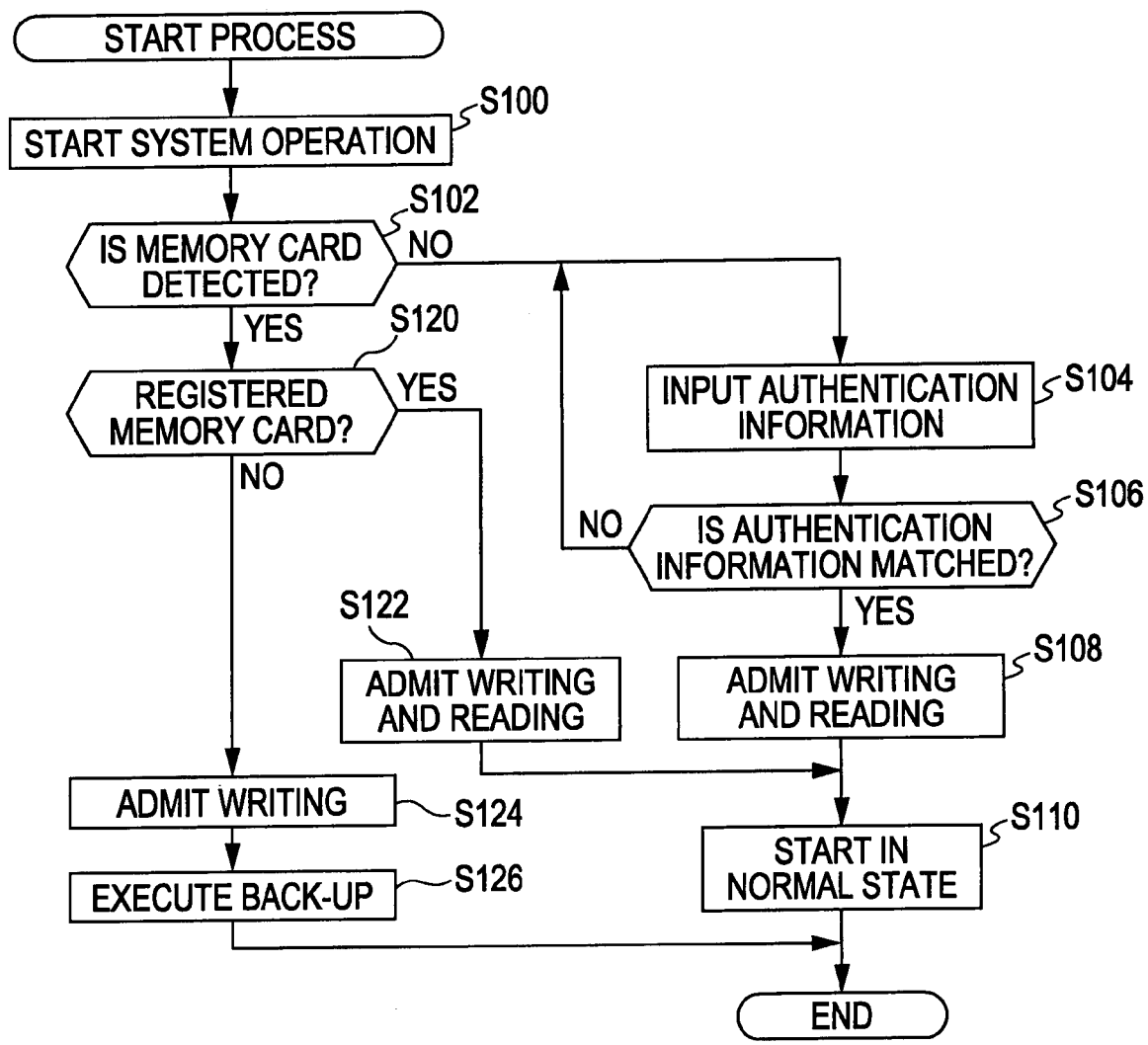
FIG. 3 is a flowchart illustrating an example of a start-up process executed by the data processing device shown in FIG. 1.

FIG. 3 is a flowchart illustrating a start-up process executed by the data processing device 10 according to the embodiment of the invention. The CPU 20 reads and executes a start-up processing program stored in the ROM 24, thereby implementing the start-up process. When the user pushes down the power button B10 and power of the data processing device 10 is turned on, the start-up process is automatically started.

As shown in FIG. 3, the data processing device 10 starts a normal system operation by starting up the hard disk drive 26 or the memory card interface 30 first of all (Step S100).

However, in the embodiment, it is set so that the USB interface 32 is not normally operated in spite of connection of the host terminal 70. For example, when the slot SL serves as a slot of the CF memory card slot, a signal D− is pulled up in a communication mode of a USB set to a low speed mode and a signal D+ is pulled up in the communication mode of a USB set to a full speed mode or a high speed mode. Accordingly, the data processing device 10 disables the signals D− and D+ to be pulled up in spite of a requirement from the host terminal 70. By this configuration, although the host terminal 70 is connected to the USB interface 32, the host terminal 70 can be disconnected from the data processing device 10.

Next, the data processing device 10 judges whether or not a memory card 102 is inserted into the slot SL (Step S102). When the slot SL serves as the slot of the CF memory card, signals CD1 and CD2 of the CF memory card slot are changed to a low level state during the CF memory card is inserted into the slot SL. Accordingly, the data processing device 10 can judge whether or not the memory card 60 is inserted into the slot SL by detecting whether the signals CD1 and CD2 are changed to a high level or the low level.

When the memory card 60 is not inserted into the slot SL (Step S102: NO), the data processing device 10 allows the user to input the authentication information (Step S104). In the embodiment, since the authentication information is constituted by a password, the user inputs the password by operating the numeric keypad T10. Further, in the embodiment, the user is pressed for input of the authentication information by quickly turning the display element L10 on and off in green.

When the authentication information is input, the data processing device 10 judges whether or not the input authentication information matches authentication information registered in advance (Step S106). In other words, in the embodiment, a password previously registered by the user is nonvolatily stored in the hard disk drive 26. As the result, the data processing device 10 reads the registered password from the hard disk drive 26 and judges whether or not the read password matches the password input by the user in Step S104.

As a result of a judgment in Step S106, when the authentication information does not match (Step S106: NO), the data processing device 10 presses the user for the input of the authentication information again in Step S104.

On the other hand, as the result of the judgment in Step S106, when the authentication information matches (Step S106: YES), the user is allowed to write the data into the hard disk drive 26 and to read the data stored in the hard disk drive 26 (Step S108). In a normal state, the data processing device 10 is started (Step S110). In the embodiment, since the signals D− and D+ can be pulled up in Step S108, the host terminal 70 can treat the data processing device 10 as the USB device, thereby writing the data into the hard disk drive 26 and reading the data from the hard disk drive 26. When the host terminal 70 actually starts to connect the data processing device 10, it can be permitted that the USB device is connected to the host terminal 70 by pulling up the signals D− and D+. Accordingly, the host terminal 70 is connected to the data processing device 10. Subsequently, the host terminal 70 notifies the data processing device 10 which is the USB device by issuing a bus reset in the data processing device 10 which is the USB device. Accordingly, negotiation (bus enumeration) is started.

On the contrary, in Step S102 described above, when it is judged that the memory card 60 is inserted into the slot SL (Step S102: YES), the data processing device 10 judges whether or not the memory card 60 inserted into the slot SL is a memory card previously registered in the data processing device 10 (Step S120).

Various embodiments of registration of the memory card 60 may be applied. For example, when the authentication information can be written into the memory card 60, the data processing device 10 generates the authentication information on the basis of a user's instruction in advance and writes the authentication information into the memory card 60 and the hard disk drive 26. In Step S120, the authentication information written into the memory card 60 is read and when the read authentication information matches the authentication information written into the hard disk drive 26, it is judged that the authentication information matches.

For example, when the CF memory card is used as the memory card 60, the data processing device 10 generates a random number or a random key word as identification information and writes it into both the CF memory card and the hard disk drive 26.

When the data processing device 10 writes the identification information into the CF memory card, the data processing device 10 may hold an even written sector number in the hard disk drive 26. The data processing device 10 judges that the memory card inserted into the slot SL matches the memory card previously registered only when both the identification read from the memory card and the sector number reading the identification information match the identification information and the sector number held by the data processing device 10 at the time of judging whether or not the memory card, inserted into the slot SL matches the memory card registered in advance. By this configuration, although the identification information written into the CF memory card is copied to other CF memory card by the third parties, the sector number into which the identification information is written is different. Accordingly, it is not falsely recognized that the copied memory card is the registered memory card.

When unique identification information for specifying an individual is previously applied to the memory card 60, the data processing device 10 may read the identification information of the memory card 60 and may store the read identification information in the hard disk drive 26 at the time of registering the memory card 60 in the data processing device 10. In this case, in Step S120, it is judged whether or not the unique identification information read from the memory card 60 matches the identification information stored in the hard disk drive 26.

For example, since the unique identification information is written into a CID register (128 bits) of the SD memory card, the information of the CID register may be written into the hard disk drive 26 as the identification information applied in advance.

When the memory card 60 is registered in the data processing device 10, the data processing device 10 generates an encryption key and stores the encryption key in the memory card 60, and may store a key word which can be decoded with the encryption key in the hard disk drive 26. In this case, in Step S120, the data processing device 10 judges whether or not the authentication information matches by judging whether or not the key word read from the hard disk drive 26 is normally decoded with the encryption key read from the memory card 60.

As known from the above-mentioned description, in the embodiment, matching of the authentication information includes various embodiments for authenticating that the memory card 60 is previously registered in the data processing device 10 in addition to a case where the authentication information written into the memory card 60 matches the authentication information registered in the data processing device 10. Various embodiments may be used as the embodiment of the matching of the authentication information in the same manner as the judgment in Step S106 described above.

In Step S120, when it is judged that the memory card 60 inserted into the slot SL is the memory card registered in advance (Step S120: YES), the user is allowed to write the data into the hard disk drive 26 and to read the data stored in the hard disk drive 26 (Step S122). In the normal state, the data processing device 10 is started (Step S110). In the embodiment, in Step S122, when the host terminal 70 is connected to the USB interface 32 by pulling up the signals D− and D+, the host terminal 70 is connected to the data processing device 10 in the same manner as Step S108 described above.

On the contrary, in Step S120, when it is judged that the memory card 60 is not the memory card registered in advance (Step S120), the user is allowed to write the data into the hard disk drive 26, but is not allowed to read the data stored in the hard disk drive 26 (Step S124). However, although the host terminal 70 is connected to the USB interface 32, the host terminal 70 is disconnected from the data processing device 10.

It is necessary to remove the security protection so as to access the hard disk drive 26 in Step S126 to be described below when a security protection for the hard disk drive 26 is performed. A representative example of the security protection of the hard disk drive includes a Security Mode Feature Set function. It is possible to normally access the hard disk drive corresponding to the function just after the power is turned on. However, when a password of 32 bytes is registered using a Security Set Password command, the hard disk drive is subjected to the security protection. Accordingly, it is difficult to access the hard disk drive. In this case, it is necessary for the data processing device 10 to remove the security protection by issuing a Security Unlock command and the password so as to access the hard disk drive 26.

Next, the data processing device 10 executes a back-up of the data (Step S126). In other words, the data processing device 10 reads the data stored in the memory card 60 and writes the read data into the hard disk drive 26. Here, in Step S126, since the data processing device 10 is allowed to write the data into the hard disk drive 26, it can execute the back-up from the memory card 60.

In the embodiment of the invention, the back-up is automatically executed, but the back-up may be executed by pushing down the back-up button B16 provided in the data processing device 10.

When the user pushes down the back-up button B16 while inserting the memory card 60 into the slot SL at the time of starting up the data processing device 10 via Step S108 or Step S122, the user can back up the data into the hard disk drive 26 from the memory card 60.

Figure 4:
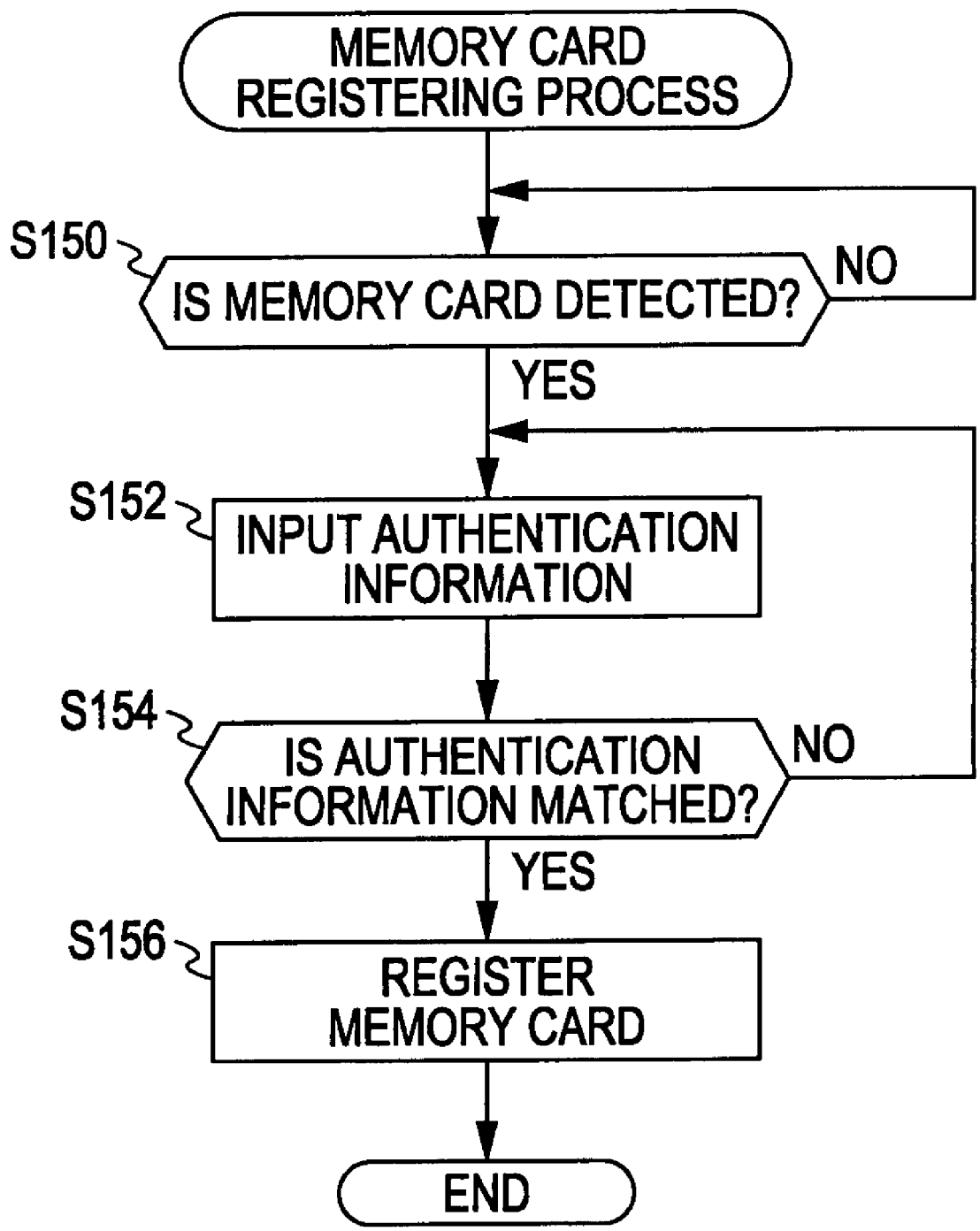
FIG. 4 is a flowchart illustrating an example of a memory card registration process executed by the data processing device shown in FIG. 1.

FIG. 4 is a flowchart illustrating a memory card registration process executed by the data processing device 10 according to the embodiment of the invention. The CPU 20 reads and executes a memory card registration processing program stored in the ROM 24, thereby implementing the memory card registration process. The memory card registration process is started when the user instructs to register the inserted memory card 60 in the data processing device 10 by pushing down the card registering button B14.

As shown in FIG. 4, the data processing device 10 judges whether or not the memory card 60 is inserted into the slot SL first of all in the memory card registration process (Step S150). A specific judgment method is similar as that in Step S102 described above. When the memory card 60 is not inserted into the slot SL (Step S150: NO), the data processing device 10 waits until the memory card 60 is inserted into the slot SL in Step S150.

On the other hand, when the memory card is inserted into the slot SL (Step S150: YES), the data processing device 10 allows the user to input the authentication information (Step S152). In the embodiment, the user inputs the password by operating the numeric keypad T10 in the same manner as Step S104 described above.

Next, the data processing device 10 judges whether or not the authentication information input in Step S152 matches the authentication information registered in advance (Step S154). In the embodiment, the data processing device 10 reads the registered password from the hard disk drive 26 and judges whether or not the read password matches the password input by the user in Step S152 in the same manner as Step S106 described above.

When it is judged that the authentication information does not match in Step S154 (Step S154: NO), the data processing device 10 presses the user for the input of the authentication information again in Step S152 described above. Accordingly, uncertified persons cannot register the memory card.

On the other hand, when it is judged that the authentication information matches in Step S154 (Step S154: YES), the data processing device 10 registers the memory card 60 inserted into the slot SL (Step S156). As described above, in various methods of registering the memory cad 60, the authentication information generated by the data processing unit 10 is written into the memory card 60 and the hard disk drive 26, the unique identification information of the memory card 60 is written into the hard disk drive 26 of the data processing device 10, or the encryption key generated by the data processing device 10 is written into the memory card 60 and the key word which can be decoded with the encryption key is written into the hard disk drive 26.

The memory card registration process according the embodiment of the invention is ended in Step S156.

When the user registers or changes the authentication information such as the password or the like input in the data processing device 10, the user pushes down the authentication information registering button B12. When the authentication information registering button B12 is pushed down, the data processing device 10 presses the user for the input of the authentication information and registers the authentication information in the hard disk drive 26. The authentication is input by the user at the time of changing the authentication information once registered and registration of new authentication information can be permitted only when the authentication information matches. It is notified to the user whether or not the data processing device 10 requires the input of the authentication information by changing a display state of the display element L10.

The data processing device 10 may lock the security for the hard disk drive 26 by using the Security Mode Feature Set function irrespective of user's registration of the password as the authentication information and it may lock the security for the hard disk drive 26 by using the Security Mode Feature Set function only when the user registers the password as the authentication information.

As described above, in the data processing device 10 according to the embodiment of the invention, it is necessary to input accurate authentication information in the data processing device 10 when the host terminal 70 reads the data from the hard disk drive 26 of the data processing device 10 or writes the data into the hard disk drive 26, but it is possible to back up the data of the memory card 60 in the hard disk drive 26 without the input of the authentication information when the data of the memory card 60 is backed up in the hard disk drive 26. As the result, it is possible to quickly perform the back-up of the data of the memory card 60 after the power of the data processing device 10 is turned on.

For example, as a result of sequentially accumulating image data picked up by an image pick-up device in the memory card 60, when a capacity of the memory card 60 is used up during pick-up, the data of the memory card 60 is quickly backed up in the hard disk drive 26 of the data processing device 10. Accordingly, the capacity thereof is formed in the memory card 60, thereby continuing the pick-up.

Even when the data processing device 10 is lost or stolen, the data stored in the hard disk drive 26 cannot be read without the input of the accurate authentication information. Accordingly, it is possible to improve the security for the data stored in the data processing device 10.

When the memory card 60 in which the authentication information is registered is inserted into the slot SL, the input of the authentication information is omitted. Accordingly, a real user can reduce an effort to input the authentication information under various conditions. For example, when the real user inserts the memory card 60 in which the authentication information is registered, the host terminal 70 is connected to the data processing device 10 without the input of the authentication information. Accordingly, the host terminal 70 can read the data from the hard disk drive 26.

In addition, since the memory card 60 is generally inserted into the image pick-up device, the memory card 60 is not inserted into the data processing device 10 at the time of carrying the data processing device 10. Accordingly, although the input of the authentication information is omitted, an uncertified third party cannot read the data from the hard disk drive 26, whereby a security level of the data is not lowered.

In the above-mentioned the embodiment, since storage connection between the host terminal 70 and the data processing device 10 cannot be performed by not pulling up the signals D− and D+, it is possible to realize the data processing device 10 according to the embodiment of the invention without a special cost. In particular, in the embodiment, since the display screen is not provided in the data processing device 10, there is no possibility that the third party will actually steal a glance at the data when the data processing device 10 is disconnected from the external host terminal 70.

Second Embodiment

The display screen is not provided in the data processing device 10 according to the first embodiment of the invention, but since the display screen is provided in the data processing device 10 according to a second embodiment of the invention, it is possible to improve the user convenience while ensuring the security for the data stored in the data processing device 10 in which the display screen is provided. Hereinafter, parts different from the above-mentioned first embodiment of the invention will be described.

Figure 5:
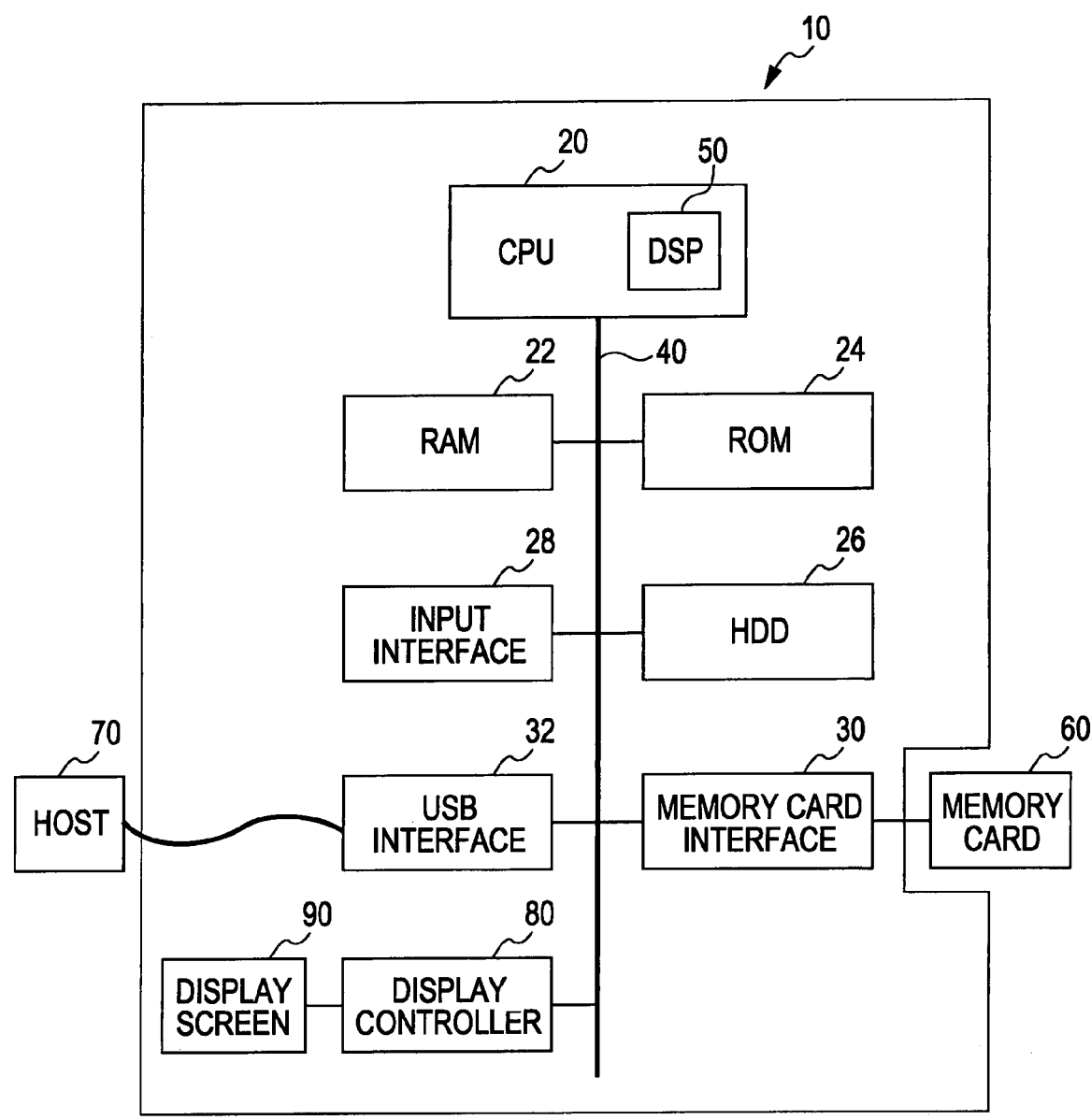
FIG. 5 is a block diagram illustrating an example of an internal configuration of a data processing device according to a second embodiment of the invention.

FIG. 5 is a block diagram illustrating an example of the internal configuration of the data processing device 10 according the embodiment of the invention and is a diagram corresponding to FIG. 1 according to the first embodiment of the invention. As shown in FIG. 5, in the data processing device 10 according to the embodiment of the invention, a display screen 90 is connected to an internal bus 40 via a display controller 80. The display screen 90 is constituted by, for example, an LCD (Liquid Crystal Display).

Figure 6:
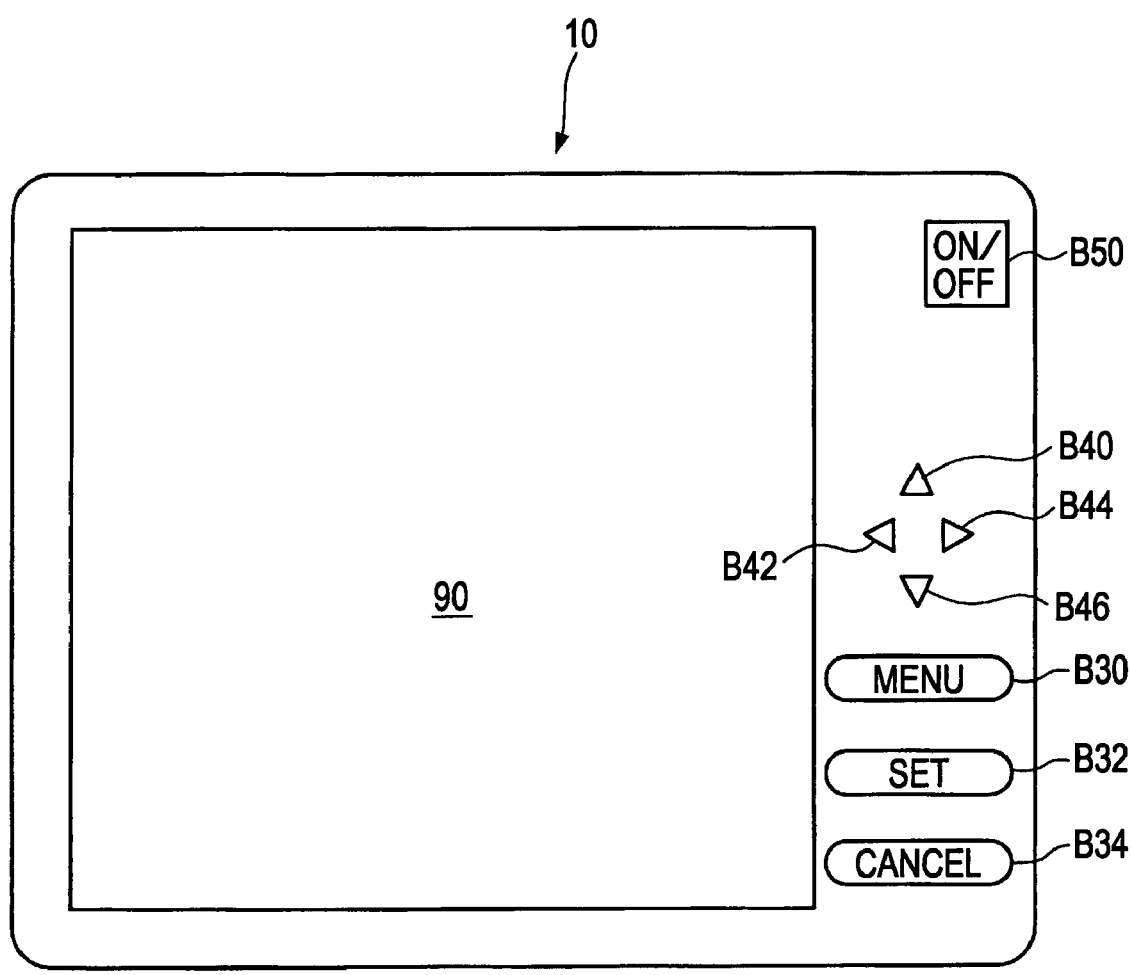
FIG. 6 is a front view illustrating an example of a layout of the data processing device shown in FIG. 5.

FIG. 6 is a plan view illustrating a layout of the data processing device 10 according to the embodiment of the invention viewed from the display screen 90 side. As shown in FIG. 6, a menu button B30, a set button B32, and a cancel button B34 are provided on a right side of the display screen 90. A moving up button B40, a moving left button B42, a moving right button B44, and a moving down button B46 operated by a user's finger are provided above the above-mentioned buttons.

The menu button B30 is an operation button for displaying various menu screens on the display screen 90. The set button B32 is an operation button pushed down for finally settling operation contents when various operations are performed. In the embodiment, the set button B32 is a button pushed down for selecting a process which the user desires, in particular, when a cursor is located in the process which the user desires.

The cancel button B34 is an operation button pushed down when instruction contents are not finally reflected although the user intends to perform various setting operation. The moving up button B40, the moving left button B42, the moving right button B44, and the moving down B46 are operation buttons for respectively moving up, left, right, and down on the menu screen and other screens.

The power button B50 for switching the power of the data processing device 10 on/off is provided above the movement buttons B40, B42, B44, and B46. In the embodiment, writing of the data into the hard disk drive 26 or reading of the data stored in the hard disk drive 26 is not permitted at the time when the data processing device 10 is started by pushing down the power button B50 and turning on the power. In other words, the image data stored in the hard disk drive 26 is not displayed on the display screen 90. At the time when the data processing device 10 is started by turning on the power, the signal D+ or D− is not pulled up and the host terminal 70 connected to the USB interface 32 is disconnected from the data processing device 10.

Figure 7:
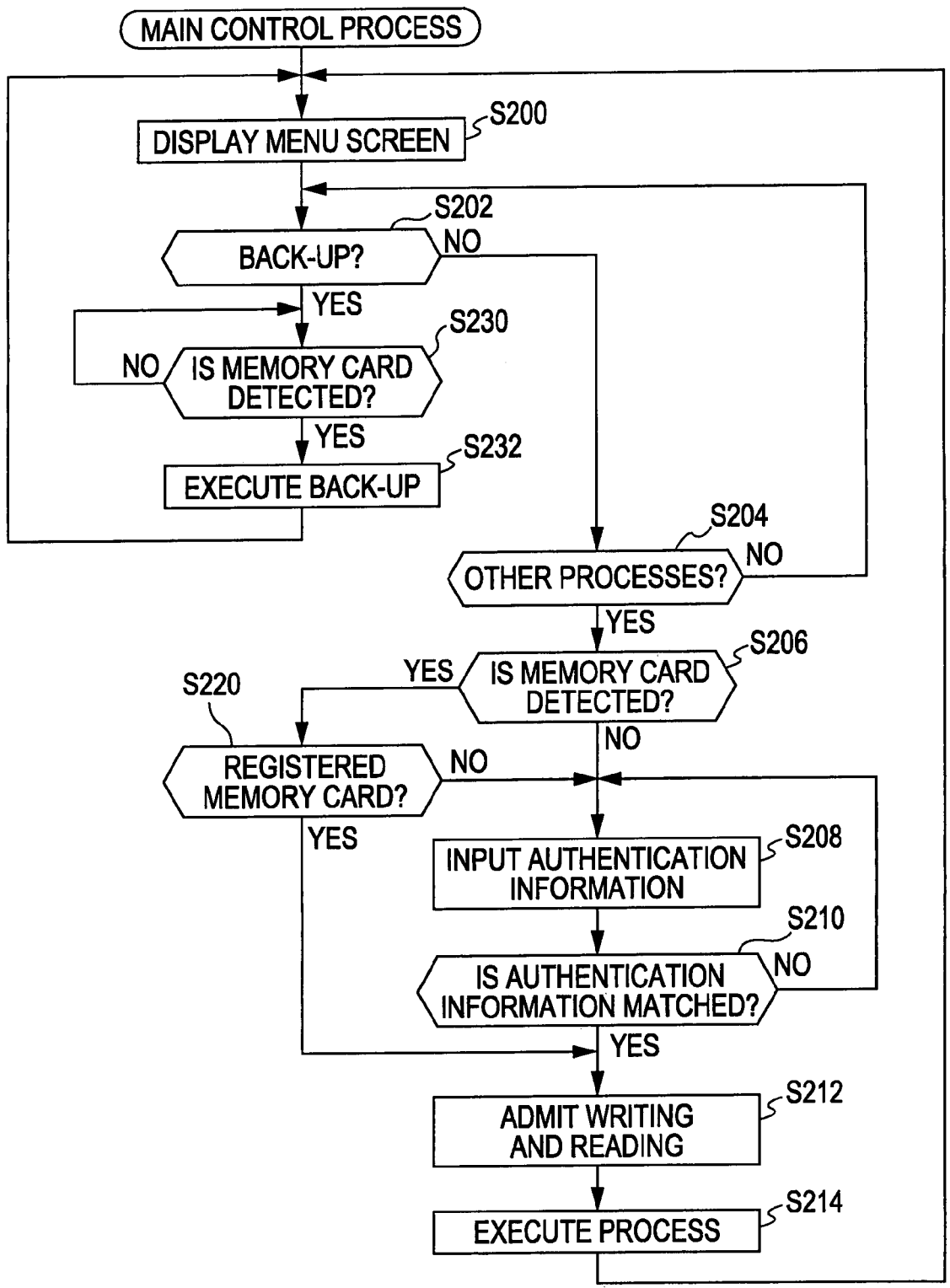
FIG. 7 is a flowchart illustrating an example of a main control process executed by the data processing device shown in FIG. 5.

FIG. 7 is a flowchart illustrating a main control process executed by the data processing device 10 according to the embodiment of the invention. The CPU 20 reads the main control processing program stored in the ROM 24, thereby executing the main control process. The main control process is automatically started after a system is started when the user pushes down the power button B50 to turn on the power of the data processing device 10.

Figure 8:
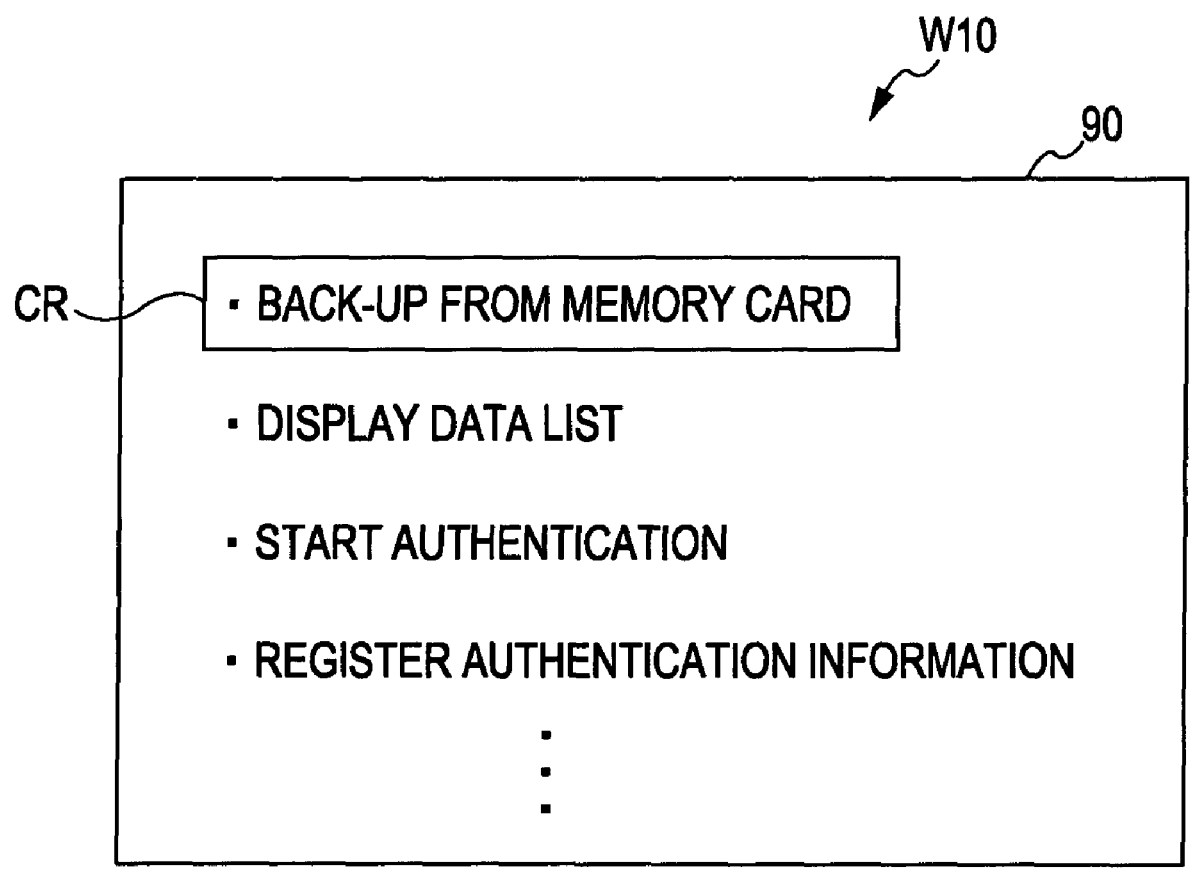
FIG. 8 is a diagram illustrating an example of a menu screen displayed on a display screen of the data processing device shown in FIG. 5.

As shown in FIG. 7, the data processing device 10 displays the menu screen on the display screen 90 in the start-up process (Step S200). FIG. 8 is a diagram illustrating an example of a menu screen W10 displayed on the display screen 90 according to the embodiment of the invention. As shown in FIG. 8, various processes such as "back-up from memory card", "display data list", "start up authentication", "register authentication information", and the like are displayed on the menu screen W10 as selective items and a cursor CR for designating the selective items is displayed on the menu screen W10. The cursor CR can move up and down by operating the moving up button B40 and the moving down button B46. When the cursor CR is located on the selective item of the process which the user desires, the user can select the process by pushing down the set button B32.

Next, as shown in FIG. 7, the data processing device 10 judges whether or not the user selects the "back-up from memory card" (Step S202). When the "back-up from memory card" is not selected (Step S202: NO), the data processing device 10 judges whether or not the user selects the processes other than the "back-up from memory card" on the menu screen W10 (Step S204). When the processes other than the "back-up from memory card" are not selected (Step S204: NO), that is, the user selects nothing on the menu screen W10, the data processing device 10 waits for the user's selection in Step S202 described above.

On the other hand, when it is judged that the user selects the processes other than the "back-up from memory card" in Step S204 (Step S204: YES), the data processing device 10 judges whether or not the memory card 60 is inserted into the slot SL (Step S206). The specific judgment method is similar as that in Step S102 according to the first embodiment of the invention.

When the memory card 60 is not inserted into the slot SL (Step S206: NO), the data processing device 10 presses the user for the input of the authentication information (Step S208). At this time, FIG. 9 is a diagram illustrating an example of an authentication information input screen W20 displayed on the display screen 90 of the data processing device 10 according to the embodiment of the invention.

Figure 9:
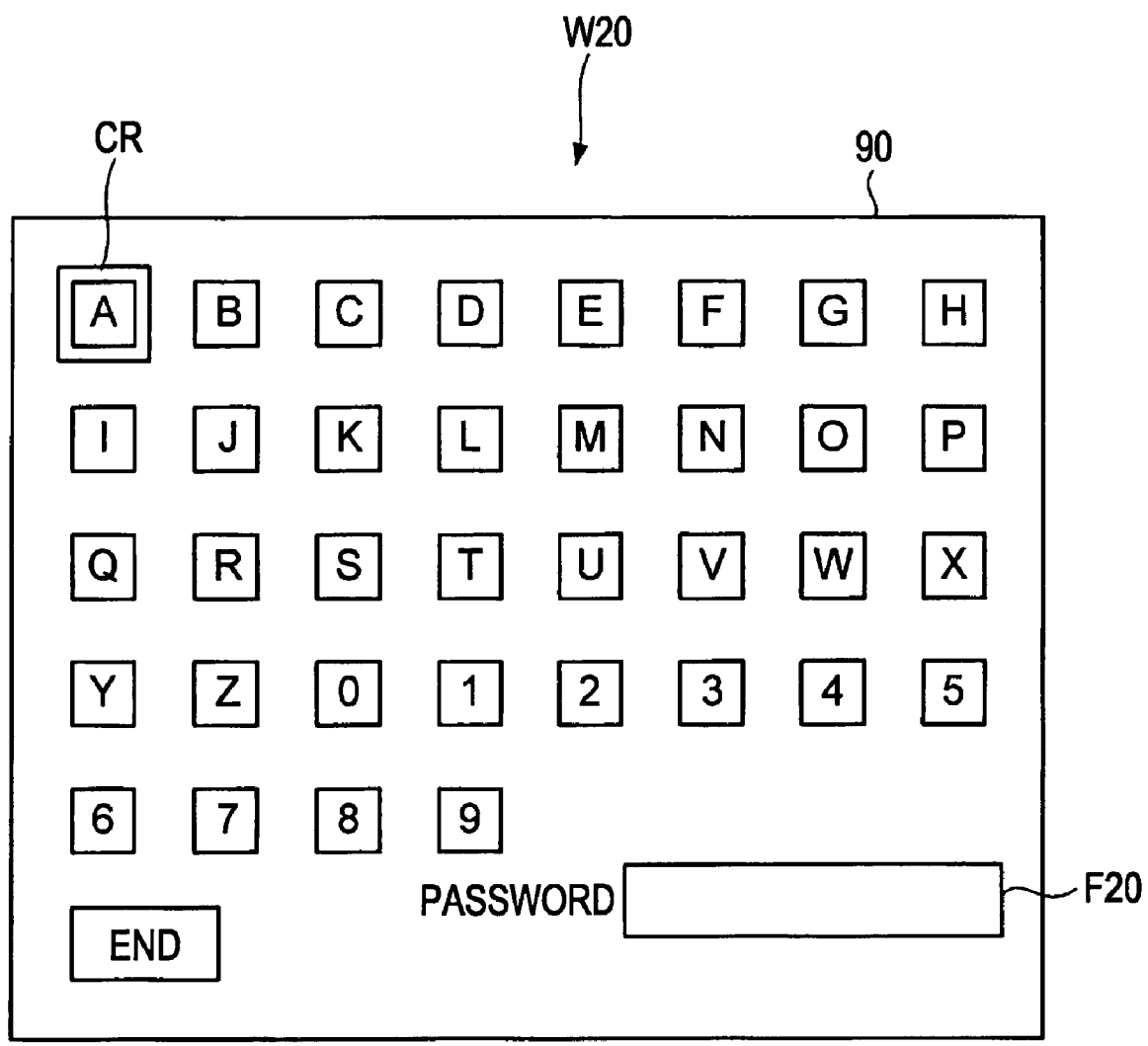
FIG. 9 is a diagram illustrating an example of an authentication information input screen displayed on the display screen of the data processing device shown in FIG. 5.

As shown in FIG. 9, character buttons of alphabets of "A" to "Z" and numerals of "0" to "9" and the cursor CR are displayed on the authentication information input screen W20. The user can move the cursor CR to a character button which the user desires to input by operating the movement buttons B40, B42, B44, and B46 and can input the authentication information by pushing down the set button B32. As known from the above-mentioned description, in the embodiment, the password is used as the authentication information. The password input by the user is displayed in a password display field F20. However, characters input by the user may be just displayed in the password display field F20 or asterisks may be displayed therein so that the third parties cannot know the password. When the input of the password is completed, the user moves the cursor CR to the "END" button and pushes down the set button B32.

Next, as shown in FIG. 7, the data processing device 10 judges whether or not the authentication information input by the user matches the authentication information stored in the hard disk drive 26 (Step S210). Various embodiments may be used as the embodiment of the matching of the authentication information in the same manner as the first embodiment.

When it is judged that the authentication information does not match (Step S210: NO), the data processing device 10 presses the user for the input of the authentication information again in Step S208.

On the other hand, when it is judged that the authentication information matches (Step S210: YES), the data processing device 10 allows the user to write the data into the hard disk drive 26 and to read the data stored in the hard disk drive 26 (Step S212). The data processing device 10 executes the process selected by the user (Step S214). For example, when the user selects the "display data list", the data processing device 10 accesses the hard disk drive 26 and displays the data list. Regarding the image data, the data processing device 10 may read the image data from the hard disk drive 26 and it may display the read image data as thumbnails by setting the display of the list.

When Step S212 is once executed, the data processing device 10 can read the data stored in the hard disk drive 26, write the data into the hard disk drive 26, or display information based on the read data on the display screen 90.

When the host terminal 70 is connected to the data processing device 10, the signal D− or D+ can be pulled up. Accordingly, the host terminal 70 can treat the data processing device 10 as the USB device, thereby writing the data into the hard disk drive 26 and reading the data from the hard disk drive 26.

When the data of the memory card 60 inserted into the slot SL is viewed, the input of the authentication information is arbitrarily required. In other words, the data of the memory card 60 may be viewed without the input of the authentication information or the data of the memory card 60 may be viewed only when the authentication information matches.

After the process in Step S214, the data processing device 10 displays the menu screen W10 on the display screen 90 in Step S200.

On the contrary, when it is judged that the memory card 60 is inserted into the slot SL in Step S206 described above (Step S206: YES), it is judged whether or not the memory card 60 is the memory card registered in advance (Step S220). Various embodiments of the registration of the memory card and various methods of judging whether or not the memory card is registered may be applied in the same manner as the first embodiment. The process for registering the memory card 60 is similar as that of the first embodiment.

When it is judged that the memory card 60 is the memory card registered in advance (Step S220: YES), the data processing device 10 allows the user to write the data into the hard disk drive 26 and to read the data stored in the hard disk drive 26 in Step S212 described above.

On the other hand, when it is judged that the memory card 60 is not the memory card registered in advance (Step S220: NO), the data processing device 10 presses the user for the input of the authentication information in Step S208. In other words, since the data processing device 10 cannot obtain the authentication from the memory card 60, it requires the user to input the authentication information.

On the contrary, when it is judged that the user selects the "back-up from memory card" on the menu screen W10 in Step S202 described above (Step S202: YES), the data processing device 10 judges whether or not the memory card 60 is inserted into the slot SL (Step S230). When it is judged that the memory card 60 is not inserted into the slot SL (Step S230: NO), the data processing device 10 waits until the memory card 60 is inserted into the slot SL in Step S230.

On the other hand, when it is judged that the memory card 60 is inserted into the slot SL (Step S230: YES), the data processing device 10 executes the back-up of the data into the hard disk drive 26 from the memory card 60 (Step S232). In other words, the data processing device 10 reads the data stored in the memory card 60 and writes the read data into the hard disk drive 26. In the embodiment, the back-up is automatically executed, but the back-up may be executed after the user pushes down the set button B32 by displaying a message for requiring a user's final verification on the display screen 90. The only data selected by the user may be backed up by displaying the data list of the memory card 60 on the display screen 90.

However, it is necessary to remove the security protection so as to access the hard disk drive 26 in the same manner as the first embodiment when the security protection for the hard disk drive 26 is performed.

When the back-up is completed in Step S232, the data processing device 10 displays the menu screen W10 on the display screen 90 in Step S200 described above.

When the user registers new authentication information in the data processing device 10 or changes the authentication information in the data processing device, the user selects the "register authentication information" on the menu screen W10. When the "register the authentication information" is selected, the data processing device 10 displays the authentication information input screen W20 on the display screen 90 and when the authentication information is not registered, the data processing device 10 presses the user for the input of the authentication information. On the other hand, when the authentication information is already registered, the data processing device 10 requires the input of the authentication information already registered and only when the input information matches the authentication information already registered, the data processing device 10 permits input of the new authentication information.

As described above, the user convenience can be ensured at the time of the back-up while a data security measure for the data processing device 10 is taken even by the data processing device 10 according to the embodiment of the invention. In other words, when the data stored in hard disk drive 26 of the data processing device 10 is read or it is displayed on the display screen 90, but when the data is backed up from the memory card 60, the authentication information is required, but the authentication information is not required. Accordingly, it is possible for the user to quickly perform the back-up.

When the memory card 60 is not inserted into the slot SL, the input of the authentication information is required, but in this case, since the user intends to view the data by using the data processing device 10, the user does not make haste. Accordingly, there is no possibility that the user convenience will be lowered.

When the registered memory card 60 is inserted into the slot SL, the user is allowed to read the data stored in the hard disk drive 26 or writes the data into the hard disk drive 26 without the input of the authentication information, thereby improving the real user convenience.

The present invention is not limited to the embodiment, but can be modified in various ways. For example, in the above-mentioned embodiment, it is noted that the memory card can be registered in the data processing device 10, but the registration of the memory card is not always required. In other words, when the user does not input the authentication information from the data processing device 10 without performing the authentication by using the memory card 60, the data of the hard disk drive 26 cannot be read and exceptionally, the back-up from the memory card 60 may be executed without the input of the authentication information.

The authentication information described in the above-mentioned embodiment is just an example and various embodiments of the authentication information can be used.

In the above-mentioned embodiment, it is not permitted to write the data into the hard disk drive 26 and read the data from the hard disk drive 26 when the authentication is not obtained, but it may be permitted to write the data into the hard disk drive 26 although the authentication is not obtained. The reason thereof is as follows. When the data stored in the hard disk drive 26 is not read, a problem does not occur in the data security. Accordingly, in this case, when the data processing device 10 judges that the user is the real user from the authentication information input by the user or the memory card 60 inserted by the user, it is permitted to read the data from the hard disk drive 26.

The memory card 60 used in the above-mentioned embodiment is an example of an external storage device and various types of storage devices which can be inserted and extracted can be used as the external storage device.

Programs for executing the processes described in the above-mentioned embodiment are recorded in recording media such, as a flexible disk, a CD-ROM (Compact Disc-Read Only Memory), a ROM, the memory card, and the like and they can be distributed in the form of the recording medium. In this case, the programs recorded in the recording media are read and executed by the data processing device, thereby implementing the above-mentioned embodiment.

The data processing device 10 may have an operating system or other programs such as other applications. In this case, a program including a command calling a program implementing equal to the above-mentioned embodiment may be recorded in the recording medium out of the programs of the data processing device 10 so as to utilize other programs of a computer.

The program are not distributed in the form of the recording medium, but they may be distributed in the form of a carrier wave via a network. The program transmitted in the form of the carrier wave via the network is input into the data processing device 10 and is executed, thereby implementing the above-mentioned embodiment.

When the programs are recorded in the recording medium or when the program is transmitted in the form of the carrier wave via the network, the program may be encrypted or compressed. In this case, it is necessary to execute the data processing device 10 which reads the program from the recording medium or the carrier wave after the program is decoded or extended.

In the above-mentioned embodiment, a case where the processes are implemented by software is exemplified, but the processes may be implemented by hardware such as an ASIC (Application Specific IC) or the like.

What is claimed is:

1. A data processing device comprising:
a data storage section that stores data;
an authentication information storage section that stores first authentication information registered by a user;
an input section that allows the user to input second authentication information;
a first judgment section that permits reading of the data stored in the data storage section when the first authentication information matches the second authentication information, and does not permit reading of the data stored in the data storage section when the first authentication information does not match the second authentication information by acquiring the first authentication information from the authentication information storage section when the second authentication information is input by the input section and by comparing the first authentication information with the second authentication information;
a slot into which an external storage device can be inserted;
a writing admission section that permits writing of the data stored in the external storage device into the data storage section without input of the any authentication information when the external storage device is inserted into the slot;
a registration section that registers at least one external storage device as a storage device from which data is permitted to be read when the at least one external storage device is inserted into the slot in the data processing device;
a second judgment section that permits reading of data stored in the data storage section when the external storage device is a registered external storage device and does not permit reading of the data stored in the data storage section when the external storage device is an unregistered external storage device by judging whether or not the external storage device is an external storage device registered by the registration section when the external storage device is inserted into the slot; and
wherein the registration section generates authentication information and writes the generated authentication information into the external storage device inserted into the slot, and wherein the second judgment section reads the authentication information from the external storage device inserted into the slot and judges that the external storage device is a registered external storage device when the read authentication information matches the generated authentication information.

2. The data processing device according to claim 1, wherein the registration section reads identification information of the external storage device from the external storage device inserted into the slot and stores the read identification information in an identification information storage section, and
wherein the second judgment section reads the identification information from the external storage device inserted into the slot and judges that the external storage device is a registered external storage device when the read identification information matches the identification information stored in the identification information storage section.

3. The data processing device according to claim 1, further comprising:
a start-up section that starts up the data processing device in a state in which the data stored in the data storage section cannot be read when power is turned on.

4. The data processing device according to claim 3, further comprising:
a host connecting section that is selectively connected to a host terminal as a device terminal and selectively allows the host terminal to read the data stored in the data storage section,
wherein the start-up section is started up so that the host terminal is not allowed to read data from the data processing device although the host terminal is connected to the host connecting section.

5. The data processing device according to claim 4, wherein the host terminal is allowed to read data from the data processing device when the host terminal is connected to the host connecting section after a first judgment section judges that first authentication information matches second authentication information.

6. A method of controlling a data processing device including a data storage section storing data, an authentication information storage section storing first authentication information registered by a user, and a slot into which an external storage device can be inserted, the method comprising the steps of:
    allowing the user to input second authentication information;
    permitting reading of the data stored in the data storage section when the first authentication information matches the second authentication information, but not permitting reading of the data stored in the data storage section when the first authentication information does not match the second authentication information by acquiring the first authentication information from the authentication information storage section when the second authentication information is input by the input section and by comparing the first authentication information with the second authentication information;
    permitting writing of the data stored in the external storage device into the data storage section without input of the second any authentication information when the external storage device is inserted into the slot;
    registering at least one external storage device as a storage device from which data is permitted to be read when the at least one external storage device is inserted into the slot in the data processing device;
    permitting reading of data stored in the data storage section when the external storage device is a registered external storage device and not permitting reading of the data stored in the data storage section when the external storage device is an unregistered external storage device by judging whether or not the external storage device is a registered external storage device when the external storage device is inserted into the slot; and
    wherein said registering comprises generating authentication information and writing the generated authentication information into the at least one external storage device when the at least one external storage device is inserted into the slot, and
    wherein judging whether or not the external storage device is a registered external storage device comprises reading the authentication information from the external storage device inserted into the slot and judging that the external storage device is a registered external storage device when the read authentication information matches the generated authentication information.

7. A data processing device comprising:
a data storage section that stores data;
    a host connecting section that is selectively connected to a host terminal as a device terminal and selectively allows the host terminal to read the data stored in the data storage section;
    an authentication information storage section that stores first authentication information registered by a user;
    an input section that allows the user to input second authentication information; and
    a first judgment section that allows the host terminal to read the data stored in the data storage section by allowing communication with the host terminal when the first authentication information matches the second authentication information and the host terminal is connected to the host connecting section, but does not allow the host terminal to read the data stored in the data storage section by not allowing communication with the host terminal although the host terminal is connected to the host connecting section when the first authentication information does not match the second authentication information by acquiring the first authentication information from the authentication information storage section when the second authentication information is input by the input section and by comparing the first authentication information with the second authentication information;
    a slot into which an external storage device can be inserted;
    a writing admission section that permits writing of the data stored in the external storage device into the data storage section without input of any authentication information and although the external storage device is not a registered external storage device when the external storage device is inserted into the slot;
    a registration section that registers at least one external storage device as a storage device from which data is permitted to be read when the at least one external storage device is inserted into the slot in the data processing device;
    a second judgment section that allows communication with the host terminal when the host terminal is connected to the host connecting section without input of any authentication information when the external storage device is a registered external storage device by judging whether or not the external storage device is an external storage device registered by the registration section when the external storage device is inserted into the slot; and
    wherein the registration section generates authentication information and writes the generated authentication information into the external storage device inserted into the slot, and wherein the second judgment section reads the authentication information from the external storage device inserted into the slot and judges that the external storage device is a registered external storage device when the read authentication information matches the generated authentication information.

8. The data processing device according to claim 7, wherein a display screen is not provided in the data processing device.

* * * * *